United States Patent
Ette et al.

(10) Patent No.: US 9,388,623 B2
(45) Date of Patent: Jul. 12, 2016

(54) CLOSING DEVICE FOR A VEHICLE, AND METHOD FOR OPERATING A CLOSING DEVICE

(71) Applicant: Volkswagen Aktiengesellschaft, Wolfsburg (DE)

(72) Inventors: Bernd Ette, Wolfsburg (DE); Richard Wolf, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/753,333

(22) Filed: Jun. 29, 2015

(65) Prior Publication Data

US 2015/0300074 A1    Oct. 22, 2015

Related U.S. Application Data

(63) Continuation of application No. PCT/EP2013/077623, filed on Dec. 20, 2013.

(30) Foreign Application Priority Data

Dec. 28, 2012   (DE) .......................... 10 2012 025 366

(51) Int. Cl.
| | |
|---|---|
| *B60J 5/10* | (2006.01) |
| *E05F 15/77* | (2015.01) |
| *B60R 25/24* | (2013.01) |
| *E05F 15/73* | (2015.01) |
| *E05F 15/76* | (2015.01) |

(52) U.S. Cl.
CPC ............... *E05F 15/77* (2015.01); *B60R 25/245* (2013.01); *B60R 25/246* (2013.01); *E05F 15/73* (2015.01); *E05F 15/76* (2015.01); *E05Y 2900/531* (2013.01); *E05Y 2900/546* (2013.01)

(58) Field of Classification Search
None
See application file for complete search history.

(56) References Cited

U.S. PATENT DOCUMENTS

| | | | |
|---|---|---|---|
| 5,412,379 A | 5/1995 | Waraksa et al. | |
| 5,929,769 A * | 7/1999 | Garnault ............. | B60R 25/2009 340/12.51 |
| 6,205,710 B1 * | 3/2001 | Busse ..................... | G01S 13/48 49/26 |
| 6,476,517 B1 * | 11/2002 | Okada ................... | B60R 25/245 307/10.1 |
| 6,522,027 B1 * | 2/2003 | Morillon ............... | B60R 25/245 307/10.1 |

(Continued)

FOREIGN PATENT DOCUMENTS

| | | |
|---|---|---|
| DE | 693 25 546 T2 | 4/2000 |
| DE | 101 29 177 A1 | 1/2002 |

(Continued)

*Primary Examiner* — Rami Khatib
*Assistant Examiner* — Navid Ziaeianmehdizadeh
(74) *Attorney, Agent, or Firm* — Muncy, Geissler, Olds & Lowe, P.C.

(57) ABSTRACT

A closing device includes an element which can be moved along a path, a drive, an operating element for detecting a closing request, and detector for detecting the position of an ID transmitter paired with the vehicle. The drive is designed to move the movable element along the path, and a closing movement of the movable element is started via the drive if the actuation of an operating element is detected, if an ID transmitter paired with the vehicle is detected in a first position region within a time window t following the actuation of the operating element, and if the ID transmitter paired with the vehicle is not detected in the first position region at least for a duration s, which begins at least within the time window t, after being detected in the first position region within the time window t.

17 Claims, 4 Drawing Sheets

(56) References Cited

U.S. PATENT DOCUMENTS

| | | | | |
|---|---|---|---|---|
| 6,552,649 | B1* | 4/2003 | Okada | B60R 25/2036 307/10.1 |
| 6,670,883 | B1 | 12/2003 | Asakura et al. | |
| 6,825,752 | B2* | 11/2004 | Nahata | E05B 81/78 180/273 |
| 8,054,158 | B2* | 11/2011 | Nakashima | G07C 9/00309 340/5.61 |
| 8,091,280 | B2* | 1/2012 | Hanzel | B60R 25/2054 296/146.4 |
| 8,098,130 | B2* | 1/2012 | Baruco | B60R 25/245 340/426.36 |
| 8,217,755 | B2* | 7/2012 | Martin | E05F 15/79 180/289 |
| 8,284,022 | B2 | 10/2012 | Kachouh | |
| 8,310,338 | B2* | 11/2012 | Hamada | B60R 25/245 340/5.6 |
| 8,442,728 | B2 | 5/2013 | Wagenhuber et al. | |
| 8,606,467 | B2 | 12/2013 | Gehin | |
| 8,788,152 | B2 | 7/2014 | Reimann et al. | |
| 8,868,299 | B2 | 10/2014 | Kroemke et al. | |
| 9,126,564 | B2* | 9/2015 | Ono | B60R 25/24 |
| 2001/0003405 | A1* | 6/2001 | Morillon | B60R 25/245 307/10.5 |
| 2001/0042989 | A1* | 11/2001 | Greif | B60J 5/101 296/50 |
| 2001/0054952 | A1* | 12/2001 | Desai | E05B 77/48 340/5.72 |
| 2002/0036259 | A1* | 3/2002 | Agam | G01S 15/46 250/221 |
| 2003/0105559 | A1* | 6/2003 | Avenel | E05F 15/00 701/2 |
| 2004/0066092 | A1* | 4/2004 | Muller | B60R 25/24 307/10.1 |
| 2004/0183654 | A1* | 9/2004 | Brillon | B60R 25/24 340/5.72 |
| 2005/0168322 | A1* | 8/2005 | Appenrodt | B60R 25/246 340/5.72 |
| 2007/0205863 | A1* | 9/2007 | Eberhard | B60R 25/2036 340/5.72 |
| 2008/0068145 | A1* | 3/2008 | Weghaus | B60R 25/24 340/426.25 |
| 2008/0129446 | A1* | 6/2008 | Vader | B60R 25/24 340/5.6 |
| 2010/0052848 | A1* | 3/2010 | Thunes | B60R 25/209 340/5.64 |
| 2010/0152966 | A1 | 6/2010 | Tessier | |
| 2011/0118946 | A1* | 5/2011 | Reimann | B60R 25/2036 701/49 |
| 2012/0158253 | A1* | 6/2012 | Kroemke | B60R 25/2054 701/49 |
| 2013/0079985 | A1* | 3/2013 | Wolf | E05B 83/36 701/36 |

FOREIGN PATENT DOCUMENTS

| | | |
|---|---|---|
| DE | 10 2005 042 402 A1 | 3/2007 |
| DE | 20 2005 020 140 U1 | 6/2007 |
| DE | 10 2006 037 237 A1 | 2/2008 |
| DE | 10 2007 041 288 A1 | 3/2009 |
| DE | 10 2009 017 404 A1 | 11/2009 |
| DE | 10 2009 023 594 A1 | 12/2010 |
| DE | 10 2009 047 441 A1 | 6/2011 |
| DE | 10 2010 001 263 A1 | 7/2011 |
| DE | 10 2010 006 213 A1 | 8/2011 |
| DE | 10 2010 060 364 A1 | 5/2012 |
| EP | 2 154 035 A1 | 2/2010 |
| FR | 2 899 622 A1 | 10/2007 |
| FR | 2 917 771 A1 | 12/2008 |
| FR | 2 917 773 A1 | 12/2008 |

* cited by examiner

CLOSING DEVICE FOR A VEHICLE, AND METHOD FOR OPERATING A CLOSING DEVICE

This nonprovisional application is a continuation of International Application No. PCT/EP2013/077623, which was filed on Dec. 20, 2013, and which claims priority to German Patent Application No. 10 2012 025 366.4, which was filed in Germany on Dec. 28, 2012 and which are both herein incorporated by reference.

BACKGROUND OF THE INVENTION

1. Field of the Invention

The present invention relates to a closing device for a vehicle and a method for operating a closing device of a vehicle, the device comprising an element which is movable along a path, a drive, an operating element and detector for detecting the position of an ID transmitter assigned to the vehicle, the drive being designed to move the movable element along the path.

2. Description of the Background Art

Keyless entry systems are known, in which the authorization to access a motor vehicle is ascertained without inserting a key into a vehicle lock. A device is described in DE 102005034097 A1, which makes it possible for a so-called keyless entry system to detect the key as accurately as possible in the surroundings of the vehicle. The position determination is carried out with the aid of different LF (low-frequency) antennas. Due to an adapted arrangement of the antennas and an adapted transmit power of the electromagnetic field, the position region of the vehicle key may be accurately determined in the surroundings of the vehicle.

In addition, closing devices are generally known in the conventional art, in which the rear hatch is provided with a drive and automatically closes after the actuation of a pushbutton. The pushbutton is frequently disposed on the inside of the rear hatch and is accessible only in the open position of the rear hatch. The disadvantage of this method is that a person must leave the pivoting region of the rear hatch or the door immediately after actuation of a closing request, in order to avoid interfering with the closing movement.

This disadvantage of this known method is that, to close moving elements, an action by a person is required after the person has received items to be unloaded.

A closing device of a rear hatch is furthermore known from DE 10 2009 023 594 A1, which is incorporated herein by reference, and which detects gestures as a closing signal with the aid of optical and capacitive sensors. In this case, a monitoring of the pivoting region of the rear hatch takes place with the aid of optical sensors.

A disadvantage of the conventional art is the use of additional sensors, which prevent a cost-effective approach.

SUMMARY OF THE INVENTION

It is therefore an object of the present invention to provide a method and device for eliminating at least one of the disadvantages listed above.

A method for operating a closing device of a vehicle is described according to an embodiment of the invention. The closing device comprises an element which is movable along a path, a drive, an operating element for a closing request and detector for detecting the position of an ID transmitter assigned to the vehicle. The drive is designed to move the movable element along the path. A closing movement of the movable element can be started with the aid of the drive: if the actuation of an operating element is detected; if an ID transmitter assigned to the vehicle is detected in a first position region within a first time window t following the actuation of the operating element; or if the ID transmitter assigned to the vehicle is not detected in the first position region at least for a duration s, which begins at least within first time window t, after being detected in the first position region within time window t.

An ID transmitter according to an embodiment of the present invention can be a device which identifies itself to the vehicle as being authorized. It may be, for example, a vehicle key, an ID check card, a key chain as well as a mobile device, e.g. a mobile phone or a PDA, the ID transmitter is able to communicate with the vehicle in such a way that a position region of the ID transmitter is detectable. The ID transmitter can be designed as a so-called keyless entry ID transmitter.

The first position region can include at least the vehicle interior and the pivoting region of the movable element. When unloading the vehicle interior or the trunk, the person carrying the ID transmitter may thus comfortably receive the items to be unloaded and move out of the pivoting range of the movable element after actuating the operating element for the closing request.

If the ID transmitter remains in the first position region, the closing movement is not started. If the ID transmitter is situated in the vehicle interior, an indication, e.g., an acoustic or optical indication that the ID transmitter is situated in the vehicle interior, may take place at an end of the first time window. The user is thus alerted at an early point to the fact that he must pick up the ID transmitter.

Time window t is opened after the operating element is actuated. This time window t determines how long the ID transmitter may remain in the first position region without the process being canceled. This time window t should be large enough to enable the operating person to receive items and comfortably leave the first position region. However, this time window t should be small enough that the operating person is still aware of the actuation of the operating element. Time window t advantageously comprises a time period of 1 to 20 seconds, in particular 10 seconds.

It is ensured via first duration s that the ID transmitter has reliably left the first position region. The fact that a duration s is predetermined prevents the closing movement from beginning due to a one-time detection of the ID transmitter outside the first position region. Only if the ID transmitter is situated within the first position region multiple times may it be established that no erroneous detection has occurred. The duration can be between 1 and 5 seconds, in particular 2 seconds.

In another embodiment of the method according to the invention, the ID transmitter assigned to the vehicle can be detected in a third position region at least for a duration s after being detected in the first position region within time window t. Duration s begins at least within time window t. The third position region can be situated outside the first position region. This third position region makes it possible to reliably ascertain that the ID transmitter is situated outside the first position region and an erroneous determination may be largely ruled out. In another embodiment of the method according to the invention, the third position region comprises at least two partial position regions. In each case, a separate device for detecting the position of an ID transmitter assigned to the vehicle may be assigned to the particular partial position region. However, one detector may also be used for more than one partial position region. A combination of multiple detectors for a more accurate position determination is also conceivable.

In another embodiment of the method according to the invention, one partial position region is situated in the rear region of the vehicle and at least one partial position region is situated in the region of the vehicle doors. A more accurate detection of the position of the ID transmitter is made possible by distributing the partial position regions around the vehicle.

The movement of the movable element can be stopped when the ID transmitter assigned to the vehicle is detected in a second position region, which comprises at least one partial region of the first position region. The movement of the movable element thus stops when the person carrying the ID transmitter enters the second position region, and a collision with the person carrying the ID transmitter is avoided.

The second position region can be used, according to the invention, for stopping the closing movement of the movable element when the ID transmitter enters the second position region. The second position region comprises at least one partial region of the first position region. In an embodiment, the second position region corresponds to the first position region. In another embodiment, the second position region is dynamically adapted to the particular position of the movable element, i.e., the second position region is changed by the movement of the movable element. However, it may also be provided that the second position region only has an overlapping region with the first position region.

In another embodiment of the invention, the movable element can be transferred to an opening movement after the movable element is stopped. The opening movement is stopped once the movable element has reached a defined position. The defined position is advantageously the position which the movable element occupied prior to actuating the operating element. This has the advantage that, if the person carrying the ID transmitter has forgotten an object in the vehicle, the carrying person may initiate an opening of the movable element by returning to the second position region, so that, for example, he may return an object he is holding in his hands to the vehicle.

In another embodiment of the invention, the vehicle can be automatically locked either after the actuation of the operating element is detected or after the end of the closing movement. No additional action on the part of the person carrying the ID transmitter is thus necessary to lock the vehicle. The locking request of the person can be received by the vehicle due to the actuation of the operating element prior to closing the vehicle. A locking action directly after the detection of the actuation of the operating element advantageously results in the fact that the vehicle is locked as quickly as possible, i.e., all closing elements, such as the doors, are locked immediately, so that an access to the vehicle by unauthorized persons is prevented. If a door should nevertheless remain open, the closing mechanism of the door locks, so that the door can still be closed. The movable element is still open directly after the actuation of the operating element, while the closing mechanism of the movable element is locked, so that the movable element is closed and locked after the end of the closing operation.

The invention also comprises a closing device for a vehicle, which includes an element which is movable along a path, a drive, an operating element and detector for detecting the position of an ID transmitter assigned to the vehicle, the drive being designed to move the movable element along the path.

In another embodiment of the invention, the movable element can be, for example, a rear hatch, a trunk lid, a sliding door or a hinged door. In another embodiment of the invention, the operating element can be, for example, formed by a pushbutton, a capacitive sensor or an optical sensor. In another embodiment of the invention, the operating element is accessible only if the movable element is in an at least a partially opened position.

In another embodiment of the invention, a signaling element can be disposed on the operating element for the purpose of signaling that the operating element was actuated. The signaling element remains active until the closing movement of the movable element is started or until time window t is closed. In another embodiment of the invention, the signaling alternatively or additionally takes place via a right-hand and/or left-hand brake light or a third brake light.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
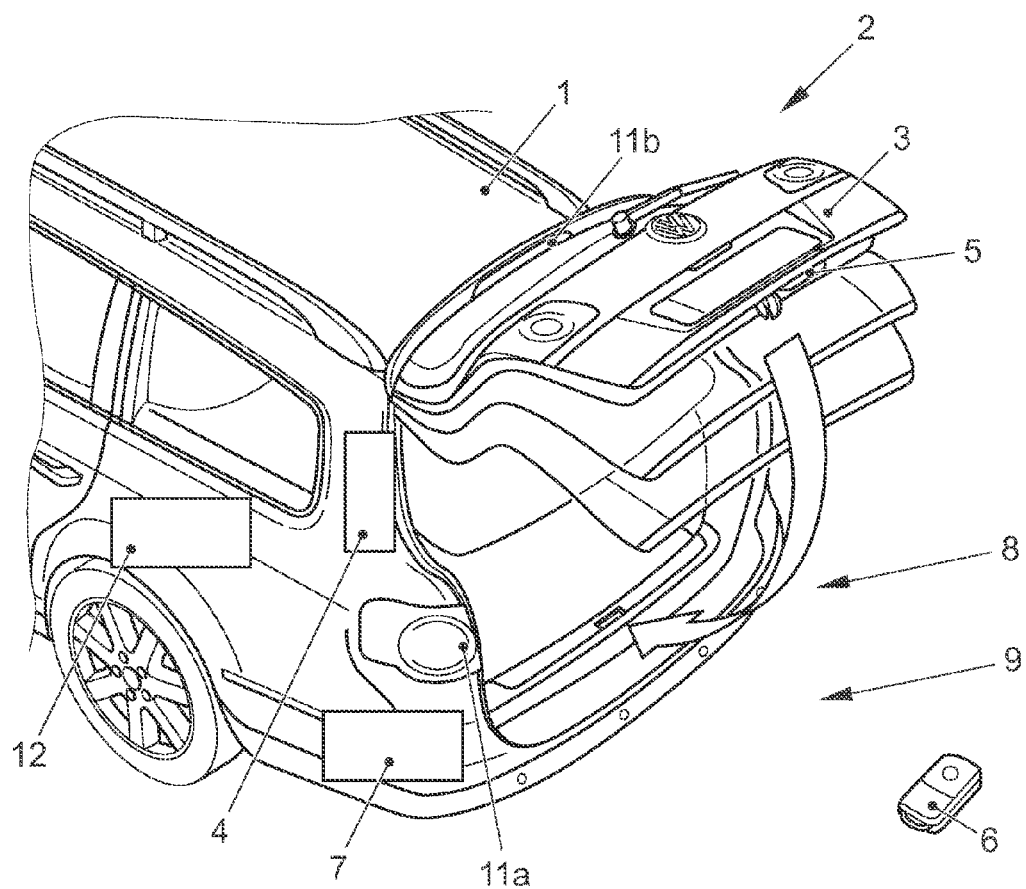
FIG. 1 shows a vehicle which includes the closing device according to the invention.

A vehicle 1 having a closing device 2 according to the invention is illustrated in FIG. 1. Closing device 2 comprises an element 3 which is movable along a path. The movable element in this case is illustrated by way of example in the form of a rear hatch of a vehicle. However, it may also be a trunk lid, a sliding door or a hinged door. Moving element 3 is moved with the aid of a symbolically illustrated drive 4. An operating element 5 is also shown, with the aid of which the closing action of the movable element may be started. A detector 7 for detecting the position of an ID transmitter 6 assigned to the vehicle are furthermore illustrated symbolically. The Detector 7 for detecting ID transmitter 6 can be implemented by, for example, conventional position finding methods using radio, ultrasound, radar or similar methods known to one skilled in the art. A first position region 8 comprises at least one interior of vehicle 1 and a pivoting region of movable element 3. Second position region 9 comprises at least one partial region of first position region 8. The closing movement of movable element 3 is started with the aid of drive 4, if the actuation of an operating element 5 is detected; if an ID transmitter 6 assigned to vehicle 1 is detected in a first position region 8 within a first time window t following the actuation of operating element 5; or if ID transmitter 6 assigned to vehicle 1 is not detected in first position region 8 at least for a duration s, which begins at least within first time window t, after the detection in first position region 8 within time window t, after being detected in first position region 8 within time window t.

The movement of movable element 3 may be stopped when ID transmitter 6 assigned to vehicle 1 is detected in a second position region 9. The actuation of operating element 5 is detected, and drive 4 is controlled, by a control unit 12. Control unit 12 is also connected to the detector 7 for detecting ID transmitter 6, using data communication. In another embodiment, a right-hand and/or left-hand brake light 11a, a third brake light 11b or a signaling unit 11 on operating unit 5 may be activated by the control unit 12.

Figure 2A:
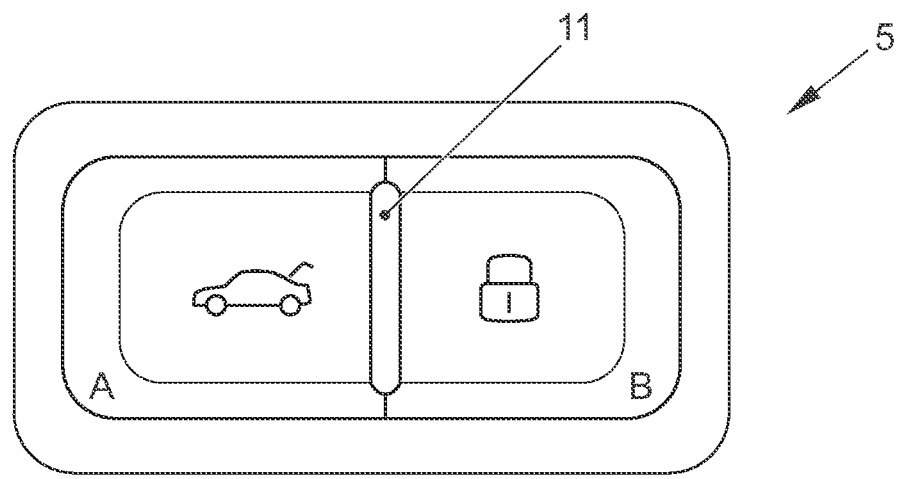
FIGS. 2a and 2b show an operating element which includes a signaling element.
Figure 2B:
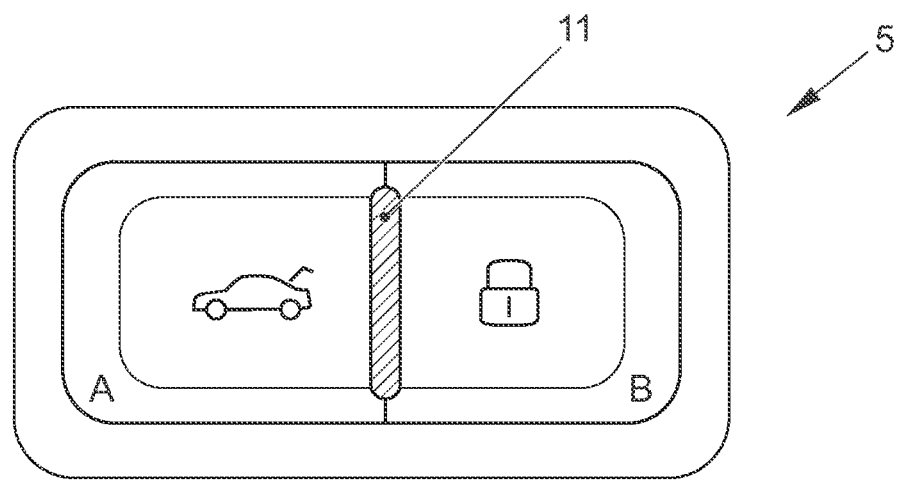

An example of an arrangement of operating element 5 is illustrated in FIGS. 2a and 2b. The operating element includes, for example, two pushbuttons (pushbutton A and pushbutton B). The pushbuttons may also be designed as capacitive or optical sensors. A signaling element 11 is illustrated between pushbutton A and pushbutton B. A signaling of the active state takes place at least until the closing movement of movable element 3 is started or until time window t is closed. Signaling element 11 is shown to be inactive in FIG. 2a and active in FIG. 2b. After pushbutton B is actuated, the rear hatch is closed and locked according to the method and device illustrated in FIG. 1.

After pushbutton A is actuated, movable element 3 opens or closes without a position finding of ID transmitter 6 taking place. A closing of the movable element is possible with the aid of pushbutton A, without the ID transmitter being in the possession of the actuating person. However, the movable element is not locked at the end of the closing operation. The closing movement following the actuation of pushbutton A may take place immediately after actuation or upon the expiry of a defined period of time.

Figure 3A:
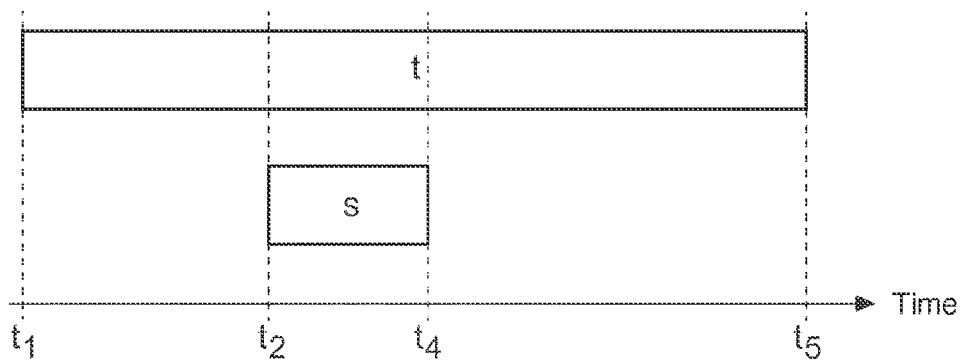
FIGS. 3a, 3b, and 3c show time sequences of an embodiment.
Figure 3B:
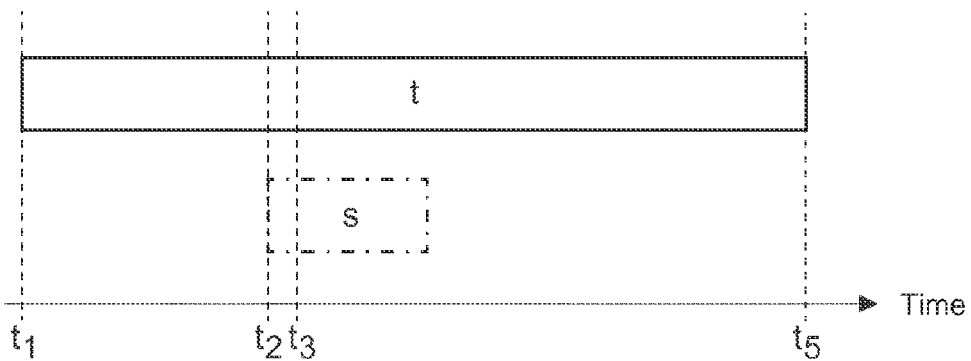
Figure 3C:
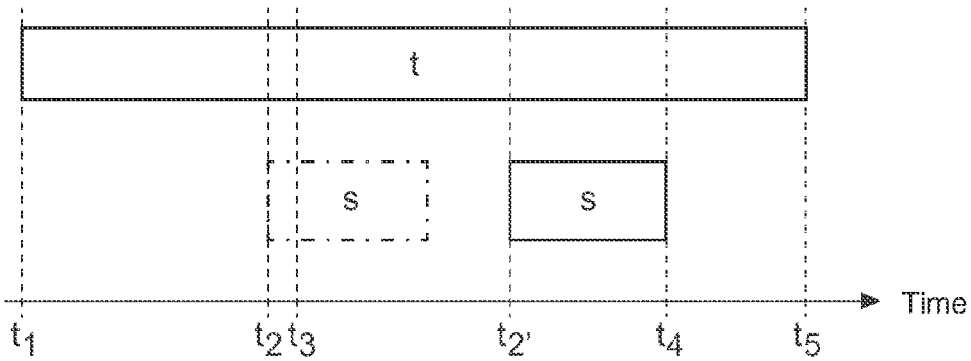

FIGS. 3a through 3c show time sequences of the method according to the invention. An example of a sequence for actuating the closing device is illustrated in FIG. 3a. Operating element 5 is actuated at point in time $t_1$, and time window t opens. Point in time $t_2$ is the point in time at which ID transmitter 6 is detected in a region outside first position region 8. ID transmitter 6 is also no longer detected in first position region 8 within duration s. At point in time $t_4$, the closing movement of movable element 3 may thus be started with the aid of drive 4.

Another example of a sequence for actuating the closing device is illustrated in FIG. 3b. Operating element 5 is actuated at point in time $t_1$, and time window t opens. Point in time $t_2$ is the point in time at which ID transmitter 6 is detected in a region outside first position region 8. ID transmitter 6 is again detected in first position region 8 within duration s, and it remains in position region 8. As a result, at point in time $t_5$, i.e. up until time window t closes, no signal is transmitted with the aid of drive 4 for a closing movement of movable element 3. Movable element 3 remains open.

Another example of a sequence for actuating the closing device is illustrated in FIG. 3c. Operating element 5 is actuated at point in time $t_1$, and time window t opens. Point in time $t_2$ is the point in time at which ID transmitter 6 is detected in a region outside first position region 8. ID transmitter 6 is again detected in first position region 8 within duration s. At point in time $t_{2'}$, ID transmitter 6 is again detected in the region outside first position region 8. ID transmitter 6 is also no longer detected in first position region 8 within another duration s. At point in time $t_4$, the closing movement of movable element 3 may thus be started with the aid of drive 4.

Figure 4:
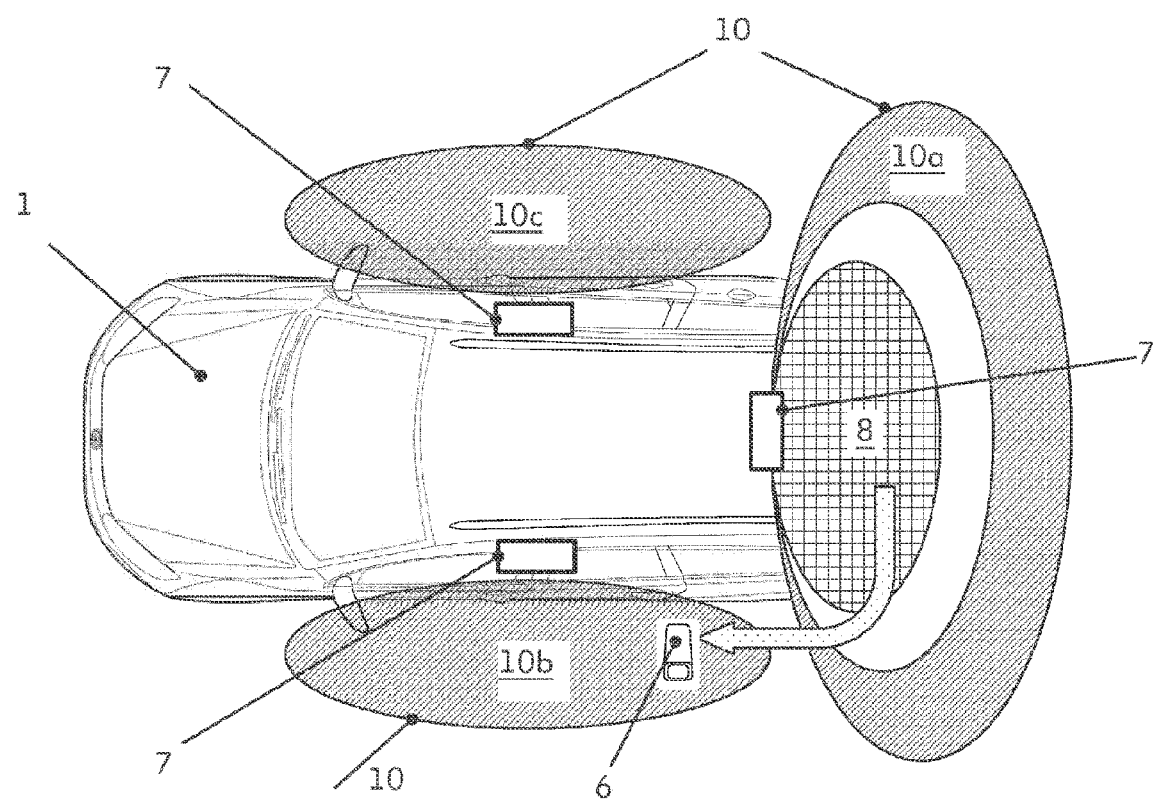
FIG. 4 shows a vehicle with the third position region and partial position regions.

Vehicle 1, including first position region 8 and third position region 10, is illustrated in FIG. 4. A closing device for a rear hatch as movable element 3 is illustrated here by way of example. The rear hatch is covered by position region 8. With the aid of FIG. 4, the present invention is illustrated on the basis of the actuation of the rear hatch of a vehicle 1 according to the invention.

To close this open rear hatch, the driver of vehicle 1, who is carrying an ID transmitter 6 assigned to vehicle 1, actuates an operating element 5 (not illustrated). Immediately after the pushbutton is actuated in this manner, the distance of ID transmitter 6 from vehicle 1 is determined. A closing movement of movable element 3 can be started if, for example, the following conditions are met: ID transmitter 6 is detected in a first position region 8 within a time window t following the actuation of operating element 5; ID transmitter 6 is not detected in first position region 8 at least for a duration s, which begins at least within first time window t, after being detected in first position region 8 within time window t; or ID transmitter 6 is detected in third position region 10, which is situated outside first position region 8, at least for a duration s, which begins at least within first time window t, after being detected in first position region 8 within time window t.

Third position region 10 comprises, for example, partial position regions 10a, 10b and 10c in FIG. 4. Alternatively, the third position region may also comprise only partial region 10a.

Partial position region 10a is situated in the region behind the vehicle and is also located outside position region 8. The detection of the position of ID transmitter 6 in first position region 8 and in partial position region 10a may take place with the aid of same detector 7 in the rear region of the vehicle. Alternatively, a separate detector may also be provided.

Partial position regions 10a and 10b are situated in the region of the side doors of vehicle 1. The detection of the position of ID transmitter 6 in partial position regions 10b and 10c may take place with the aid of particular assigned detector 7.

Alternatively, an interaction of the different detectors 7 for detecting the ID transmitter may also be facilitated in the particular position regions.

FIG. 4 shows an embodiment of the invention, including partial position regions 10a, 10b and 10c. A fast movement of a person who is carrying ID transmitter 6 from position region 8 to partial position region 10b is illustrated by way of example. The movement through partial position region 10a may be shorter than duration s. Since the ID transmitter subsequently moves to partial position region 10b, the ID transmitter may be detected for longer than duration s in position region 10. The closing movement of movable element 3 is started thereby.

Other embodiments are also conceivable. For example, the movable element may also be a sliding door. In this case, first position region 8 would be a region in the pivoting region of the sliding door, second position region 10 could comprise two partial position regions 10a, 10b, in this case position region 10a being able to be a region on the sliding door outside position region 8. With a lateral sliding door, position region 10b would be behind the rear of the vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a closing device of a vehicle, the method comprising:
providing the closing device that includes an element that is movable along a path, a drive, an operating element for detecting a closing request and a detector for detecting a position of an ID transmitter assigned to the vehicle;

moving the movable element via the drive along the path; and initiating a closing movement of the movable element via the drive based on:

detecting an actuation of the operating element and starting a time window t upon actuation of the operating element;

detecting whether the ID transmitter assigned to the vehicle is in a first position region within the time window t after the actuation of the operating element; and determining if the ID transmitter assigned to the vehicle is not detected in the first position region for at least a time duration s which begins within the time window t, after being detected in the first position region within the time window t.

2. The method according to claim 1, wherein the ID transmitter assigned to the vehicle is detected in a third position region, which is situated outside the first position region, at least for a time duration s, which begins at least within the time window t, after being detected in the position region within the time window t.

3. The method according to claim 2, wherein the third position region comprises at least two partial position regions.

4. The method according to claim 3, wherein one partial position region is situated in the rear region of the vehicle and one partial position region is situated in the region of the doors of the vehicle.

5. The method according to claim 1, wherein the movement of the movable element is stopped if the ID transmitter assigned to the vehicle is detected in a second position region.

6. The method according to claim 5, wherein the movable element is switched to an opening movement after the movable element is stopped, and wherein the opening movement is stopped when the movable element has reached a position that the movable element had assumed prior to the actuation of the operating element.

7. The method according to claim 5, wherein the second position region comprises at least one partial region of the first position region.

8. The method according to claim 5, wherein the movement of the movable element is stopped if a movement in the second position region is detected via parking distance sensors.

9. The method according to claim 1, wherein the vehicle is automatically locked either after the actuation of the operating element is detected or after the end of the closing movement.

10. The method according to claim 1, wherein a signaling takes place after the actuation of the operating element via at least one of a signaling element on the operating element or a brake light, and wherein the signaling continues to take place at least until the closing movement of the movable element is started or until the time window t is closed.

11. A closing device for a vehicle comprising:
an element that is movable along a path;
a drive;
an operating element; and
a detector for detecting a position of an ID transmitter assigned to the vehicle,
wherein the drive moves the movable element along the path, and
wherein the closing device is actuated via the method according to claim 1.

12. The closing device according to in claim 11, wherein the movable element is a rear hatch, a trunk lid, a sliding door or a hinged door.

13. The closing device according to in claim 11, further comprising a third partial position region comprising at least two partial position regions, and one partial position region is situated in a rear region of the vehicle, and one partial position region is situated in a region of the doors of the vehicle.

14. The closing device according to claim 11, wherein the operating element is a pushbutton, a capacitive sensor or an optical sensor.

15. The closing device according to claim 11, wherein at least one of a brake light or a signaling element on the operating element is used for signaling that the operating element was actuated, and wherein the signaling remains active until the closing movement of the movable element is started or until the time window t is closed.

16. The closing device according to claim 11, wherein the operating element is positioned on the movable element.

17. The method according to claim 1, wherein if the ID transmitter assigned to the vehicle is detected in the first position region during the time duration s that is provided within the time window t and the time window t ends, the initiation of the closing movement is terminated, such that the operating element must be actuated again to initiate the closing movement.

* * * * *